(12) United States Patent
Miyata

(10) Patent No.: US 9,404,762 B2
(45) Date of Patent: Aug. 2, 2016

(54) NAVIGATION APPARATUS AND NAVIGATION METHOD

(75) Inventor: Hiromasa Miyata, Tokyo (JP)

(73) Assignee: Sony Corporation (JP)

( * ) Notice: Subject to any disclaimer, the term of this patent is extended or adjusted under 35 U.S.C. 154(b) by 861 days.

(21) Appl. No.: 12/660,281

(22) Filed: Feb. 24, 2010

(65) Prior Publication Data

US 2010/0225756 A1    Sep. 9, 2010

(30) Foreign Application Priority Data

Mar. 6, 2009    (JP) .............................. P2009-053592

(51) Int. Cl.
 *H04N 7/18* (2006.01)
 *G06T 11/20* (2006.01)
 (Continued)

(52) U.S. Cl.
 CPC ........ *G01C 21/3602* (2013.01); *G01C 21/3647* (2013.01); *G01C 21/3682* (2013.01)

(58) Field of Classification Search
 CPC ......... G01S 1/02; G01S 5/0009; G01S 11/12; B60R 1/00; B61L 15/0027
 USPC .................. 348/116, 135; 382/104, 100, 103; 701/533
 IPC .................................................. H04N 7/18, 7/00
 See application file for complete search history.

(56) References Cited

U.S. PATENT DOCUMENTS

| 6,983,203 | B1 * | 1/2006 | Wako ................. | G01C 21/3682 |
| | | | | 340/988 |
| 8,098,894 | B2 * | 1/2012 | Soderstrom .................... | 382/104 |
| 2001/0024322 | A1 * | 9/2001 | Harita et al. .................. | 359/490 |

(Continued)

FOREIGN PATENT DOCUMENTS

| EP | 1622081 A1 | 2/2006 |
| EP | 2154481 A1 | 2/2010 |

(Continued)

OTHER PUBLICATIONS

Office Action from Japanese Application No. 2009-053592, dated Dec. 16, 2010.

(Continued)

*Primary Examiner* — Allen Parker
*Assistant Examiner* — Long Le
(74) *Attorney, Agent, or Firm* — Lerner, David, Littenberg, Krumholz & Mentlik, LLP

(57) ABSTRACT

A navigation apparatus includes: a current-position information acquisition section obtaining measured current-position information; a camera section obtaining a captured image of a subject; a direction detection section detecting a direction when obtaining the captured image by the camera section; from characteristic-point information related to multiple predetermined characteristic points stored in a storage section, a characteristic-point information extraction section extracting the characteristic-point information related to the characteristic points located in the vicinity of the current position and in a range shown in the direction; and a control section displaying the captured image on a display section, wherein the control section displays a predetermined direction line indicating a distance from the current position on the captured image, obtains a distance and a direction from the current position to the characteristic point, and displays the characteristic-point information at a position corresponding to the distance and the direction on the captured image.

14 Claims, 15 Drawing Sheets

(51) Int. Cl.
*G09G 5/00* (2006.01)
*G01C 21/36* (2006.01)

(56) References Cited

U.S. PATENT DOCUMENTS

| | | | | |
|---|---|---|---|---|
| 2001/0055063 A1* | 12/2001 | Nagai | ............... | G01S 11/12 348/116 |
| 2004/0169653 A1* | 9/2004 | Endo et al. | ............... | 345/427 |
| 2005/0177303 A1* | 8/2005 | Han | ............... | G01C 21/36 701/400 |
| 2007/0082658 A1* | 4/2007 | Tengler | ............... | H04M 3/53333 455/413 |
| 2007/0213927 A1* | 9/2007 | Ishigami | ............... | G01C 21/26 701/417 |
| 2009/0024322 A1* | 1/2009 | Tomita | ............... | G01C 21/3691 701/431 |
| 2009/0040370 A1* | 2/2009 | Varanasi | ............... | G01C 21/20 348/376 |

FOREIGN PATENT DOCUMENTS

| | | |
|---|---|---|
| JP | 11-148838 A | 6/1999 |
| JP | 2003106853 A | 4/2003 |
| JP | 2003132068 A | 5/2003 |
| JP | 2003287434 A | 10/2003 |
| JP | 2004-045051 A | 2/2004 |
| JP | 2004239650 A | 8/2004 |
| JP | 2006-091856 A | 4/2006 |
| JP | 2006170950 A | 6/2006 |
| JP | 2009017540 A | 1/2009 |
| WO | 2008149537 A1 | 12/2008 |

OTHER PUBLICATIONS

European Search Report from EP Application No. 10154828, dated Nov. 22, 2013.

* cited by examiner

FIG. 8

| POI | IMPORTANCE |
|---|---|
| HONEY CITY | 1 |
| ARROW WORK MARUKAWA | 3 |
| KATORE | 1 |
| MARUKAWA STATION | 1 |
| SANURA WATER RECYCLE CENTER | 3 |
| MARUKAWA CITY | 1 |
| anpn | 4 |
| MARUKAWA POST OFFICE | 3 |
| MARUMARU DAKE | 1 |
| SANKAKU MOUNTAIN | 1 |
| BATSUBATSU DAKE | 1 |
| MARUKAWA HOSPITAL | 3 |
| RESTAURANT SANURA | 4 |

US 9,404,762 B2

NAVIGATION APPARATUS AND NAVIGATION METHOD

CROSS-REFERENCE TO RELATED APPLICATION

The present application claims priority from Japanese Patent Application No. JP 2009-053592 filed in the Japanese Patent Office on Mar. 6, 2009, the entire content of which is incorporated herein by reference.

BACKGROUND OF THE INVENTION

1. Field of the Invention

The present invention relates to a navigation apparatus and navigation method, and is preferably applied to a portable navigation device which is handy to carry about, for example.

2. Description of the Related Art

To date, a portable navigation device (hereinafter, referred to as a PND) displays predetermined characteristic-points, such as various facilities (public facilities, recreational facilities, various stores, etc.) and mountains, etc., on a map so as to allow a user to check these characteristic points. These characteristic points are generally called POI (Points of Interest). Elements constituting each POI include a name, a latitude and longitude, an address, a genre, a telephone number, a URL (Uniform Resource Locator), etc.

Also, there is a portable guiding apparatus which displays a simulation image of a scene that is assumed to be seen by a user, and displays POI in the vicinity of the user on that simulation image (for example, refer to Japanese Unexamined Patent Application Publication No. 11-148838).

SUMMARY OF THE INVENTION

Incidentally, in a related-art PND described above, it is difficult for a user to understand a relationship between a scene that the user is actually seeing and a map on a plane. Also, even if the user can check a characteristic point on a map, there has been a problem in that it is difficult for the user to recognize where the characteristic point is actually located from a user's view.

The present invention has been made in consideration of the above points. It is desirable to propose a navigation apparatus and navigation method which allows a user to easily recognize where a characteristic point is actually located from a user's view.

According to an embodiment of the present invention, there is provided a navigation apparatus including: a current-position information acquisition section obtaining current-position information of a current position measured by a current-position measuring section; a camera section obtaining a captured image of a subject; a direction detection section detecting a direction at the time of obtaining the captured image by the camera section; from characteristic-point information related to a large number of predetermined characteristic points stored in a predetermined storage section, a characteristic-point information extraction section extracting the characteristic-point information related to the characteristic points located in the vicinity of the current position and in a range shown in the direction; and a control section displaying the captured image on a predetermined display section, wherein the control section displays a predetermined direction line indicating a distance from the current position on the captured image, obtains a distance and a direction from the current position to the characteristic point, and displays the characteristic-point information at a position corresponding to the distance and the direction on the captured image.

By this means, it is possible for a user to recognize the distance and the direction of a characteristic point on a captured image that the user is viewing and checking in accordance with a distance line indicating a distance from the current position. It is therefore possible for the user to recognize where the characteristic point is actually located from a user's view without being forced to do a difficult task which relates a scene that the user is actually viewing to a map on a plane.

By the present invention, it is possible for a user to recognize the distance and the direction of a characteristic point on a captured image that the user is viewing and checking in accordance with a distance line indicating a distance from the current position. Accordingly, it is possible to achieve a navigation apparatus and navigation method allowing the user to easily recognize where the characteristic point is actually located from a user's view without being forced to do a difficult task which relates a scene that the user is actually viewing to a map on a plane.

BRIEF DESCRIPTION OF THE DRAWINGS

FIG. 8 is a table used for explaining importance of POI;

DESCRIPTION OF THE PREFERRED EMBODIMENTS

In the following, a description is given of a best mode for carrying out the invention (hereinafter referred to as an embodiment). In this regard, a description will be given in the following order.

1. Embodiment
2. Another embodiment

1. Embodiment 1.1 Outer Configuration of PND

Figure 1A:
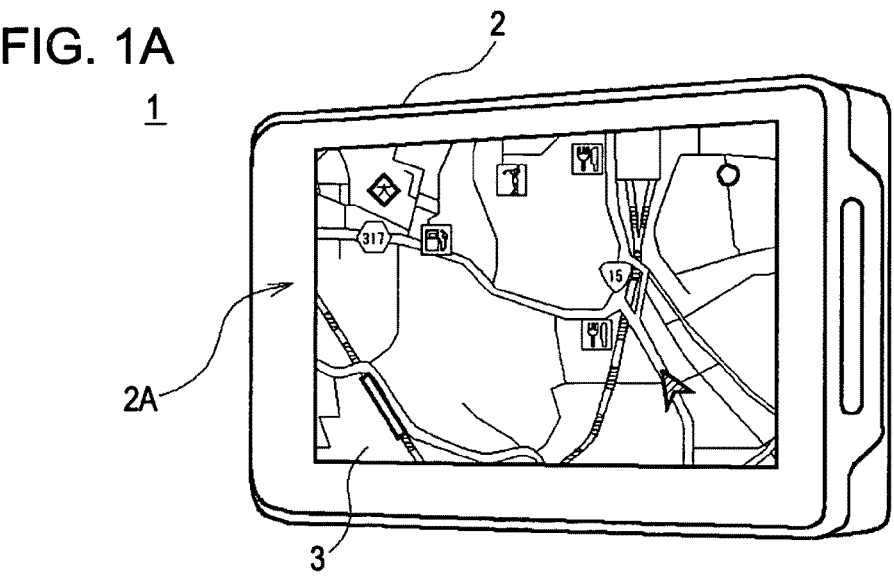
FIGS. 1A and 1B are schematic perspective views illustrating an outer configuration of a PND according to the present invention.
Figure 1B:
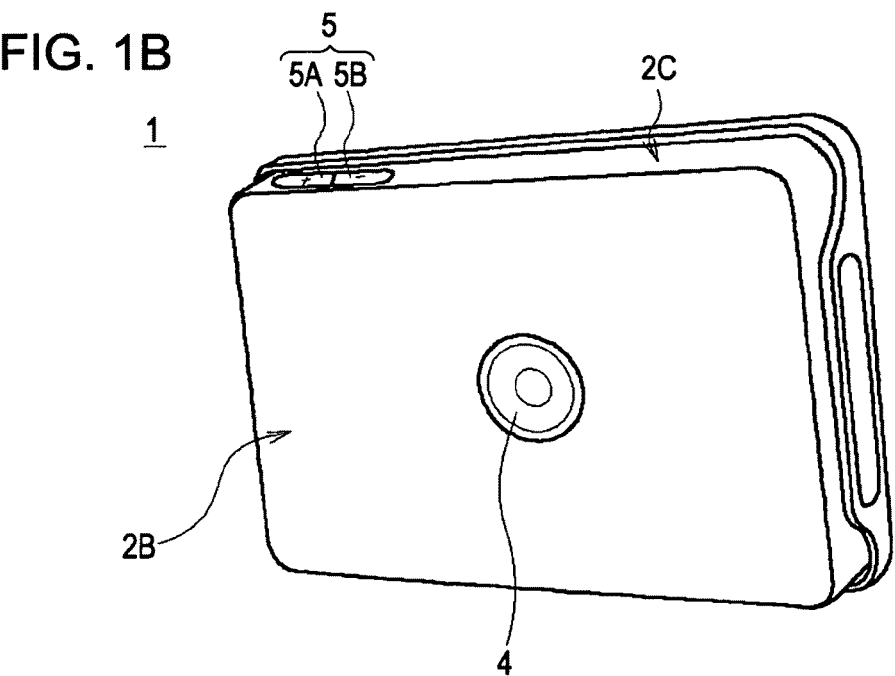

In FIGS. 1A and 1B, reference numeral 1 denotes an overall portable navigation device (hereinafter referred to as a PND) according to the present invention. The PND 1 (FIG.

1A) includes a substantially cuboid-shaped case 2. A display 3 is disposed on a front face 2A of the case 2.

The case 2 has about a size that a user can carry about in his/her single hand and check the display 3 while walking.

A camera section 4 is disposed on a back face 2B (FIG. 1B) of the case 2. The PND 1 displays, in real time, a captured image (also referred to as a through-the-lens image) of a subject (neighboring scene) taken by the camera section 4 on the display 3.

Also, zoom buttons 5 (a zoom-in button 5A and a zoom-out button 5B) are disposed on a top face 2C of the case 2. The PND 1 expands and contracts the through-the-lens image displayed on the display 3 in accordance with a user's pressing operation on the zoom buttons 5.

1.2 Circuit Configuration of PND

Figure 2:
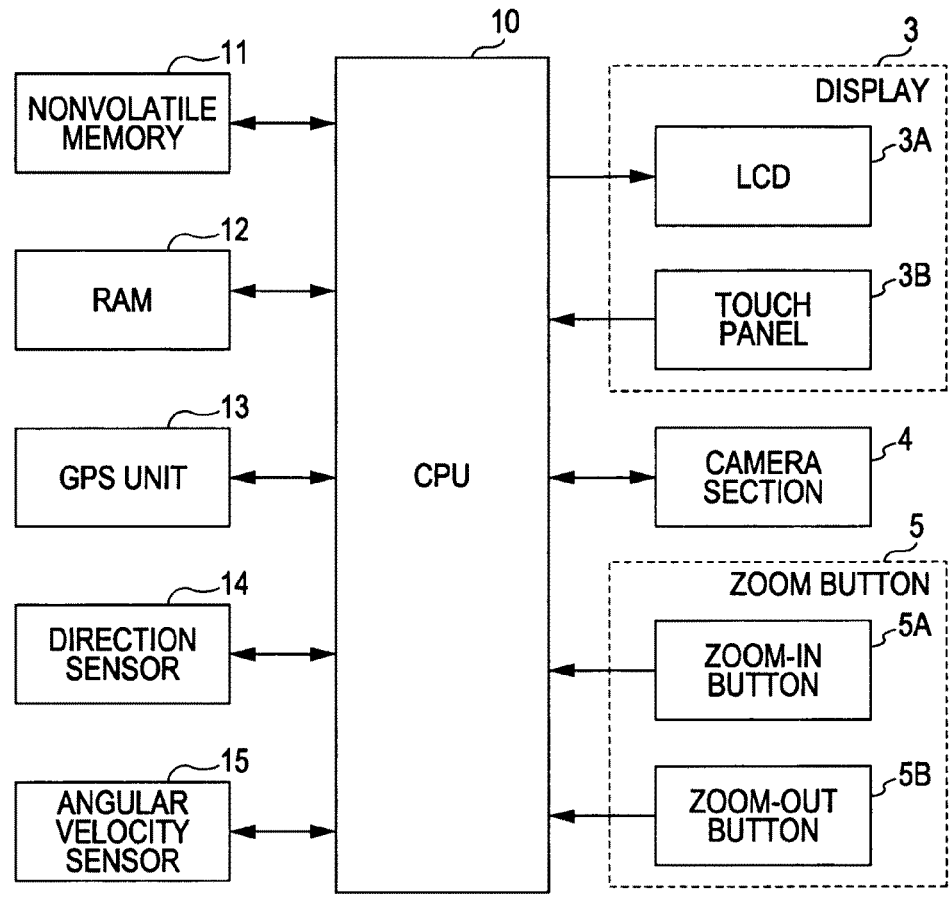
FIG. 2 is a schematic block diagram illustrating a circuit configuration of a PND according to the present invention.

As shown in FIG. 2, the PND 1 performs overall control in accordance with a basic program that a CPU 10 read from a nonvolatile memory 11 and is started in a RAM (Random Access Memory) 12.

Also, the PND 1 can perform various functions in accordance with various application programs that the CPU 10 read from the nonvolatile memory 11 and are started in the RAM 12.

A GPS (Global Positioning System) unit 13 correctly measures a current position of the PND 1 on the basis of orbital data obtained by individually receiving and demodulating satellite signals from the plurality of the GPS satellites and distance data from a plurality of GPS satellites to the PND 1. And, the GPS unit 13 transmits current-position information indicating latitude and longitude information of the measured current position to the CPU 10.

The CPU 10 reads neighboring map data including the current position of the PND 1 on the basis of the current-position information from the nonvolatile memory 11. And the CPU 10 outputs the map image including the current position on an LCD (Liquid Crystal Display) 3A of the display 3 so as to display that map image.

Incidentally, for example, POI (Points Of Interest) indicating predetermined characteristic points, such as various facilities (public facilities, recreational facilities, various stores, etc.) and mountains, etc., are recorded in the nonvolatile memory 11 in connection with map data. A POI is information on a point, and one piece of latitude and longitude information is related to one POI. In addition, POI information related to a POI includes a name, an address, a genre, a telephone number, an icon image, etc.

When displaying a map image including the current position of the PND 1 on the LCD 3A, the CPU 10 displays names of POI on that map image. And, if any POI name is selected in accordance with a touch operation of a touch panel 3B, the CPU 10 displays POI information, such as an address, a genre, a telephone number, etc., of the POI on the LCD 3A.

The camera section 4 converts incident light from a subject through a lens (not shown in the figure) held by the camera section 4 into an image signal. And the camera section 4 converts the image signal into image data by analog/digital conversion, and performs various kinds of image processing on the image data. And, the camera section 4 outputs the image data to the LCD 3A so as to display a through-the-lens image on the basis of the image data.

Also, when detecting a pressing operation on the zoom buttons 5, the CPU 10 changes an imaging angle of view of the camera section 4 in response to this, and thereby the camera section 4 changes a range of image capturing.

Specifically, if the CPU 10 detects a pressing operation on the zoom-in button 5A, the CPU 10 narrows the imaging angle of view of the camera section 4 (that is to say, changes the imaging angle of view to a telescopic side). As a result, the CPU 10 displays individual subjects on the LCD 3A in a large size, and thereby displays a through-the-lens image in a narrow range. Also, if the CPU 10 detects a pressing operation on the zoom-out button 5B, the CPU 10 camera section 4 widens the imaging angle of view of the camera section 4 (that is to say, changes the imaging angle of view to a wide-angle side). As a result, the CPU 10 displays individual subjects on the LCD 3A in a small size, and thereby displays a through-the-lens image in a wide range.

A direction sensor 14 includes a geomagnetic sensor detecting a direction by measuring geomagnetism, and detects a direction in which the camera 4 faces, that is to say, a direction in which the camera section 4 captures an image. And the direction sensor 14 transmits direction information including that direction information to the CPU 10.

Figure 3:
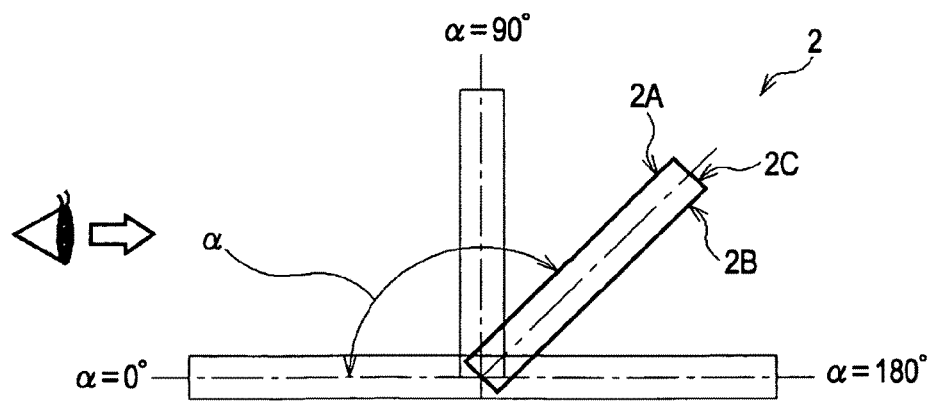
FIG. 3 is a schematic diagram used for explaining a method of detecting an inclination of a case.

An acceleration sensor 15 detects an angle of inclination $\alpha$ of the case 2 in the up-and-down direction by measuring a gravitational acceleration applied to the case 2. Specifically, as shown in FIG. 3, the acceleration sensor 15 assumes an angle of inclination $\alpha=0[°]$ in a state in which the front face 2A of the case 2 faces just downward. The acceleration sensor 15 detects how much the case 2 is inclined from that state as an angle of inclination $\alpha$. That is to say, when the top face 2C of the case 2 faces just upward, an angle of inclination $\alpha=90[°]$, and when the front face 2A faces just upward, an angle of inclination $\alpha=180[°]$. And the acceleration sensor 15 transmits angle-of-inclination information indicating the angle of inclination $\alpha$ to the CPU 10.

1.3 Neighboring POI Display Processing Procedure

Next, using a flowchart in FIG. 4, a detailed description will be given of a procedure in which the PND 1 displays neighboring POI information of the PND 1 on a through-the-lens image taken by the camera section 4 (also referred to as neighboring-POI display processing procedure). This neighboring-POI display processing procedure is processing executed by the CPU 10 of the PND 1 in accordance with a neighboring POI program, which is an application program. In this regard, POI located in a neighborhood of the PND 1 is also called a neighboring POI.

In the CPU 10 of the PND 1, the processing enters the start step of a routine RT1 and proceeds to the next step SP1, the current position information indicating latitude and longitude information of the current position of the PND 1 is obtained from the GPS unit 13, and the processing proceeds to the next step SP2.

In step SP2, the CPU 10 obtains angle-of-inclination information indicating an angle of inclination $\alpha$ of the case 2 of the PND 1, which is measured by the acceleration sensor 15, and determines the posture of the case 2 on the basis of the angle-of-inclination information.

Figure 5A:
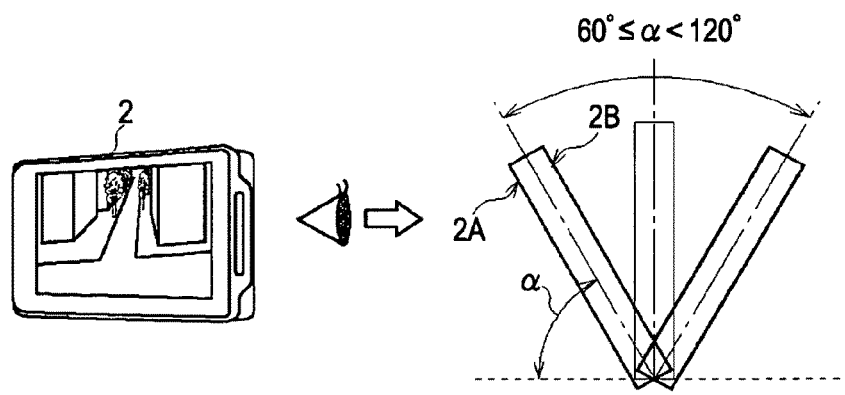
FIGS. 5A and 5B are schematic diagrams used for explaining a method of determining a posture of a case.
Figure 5B:
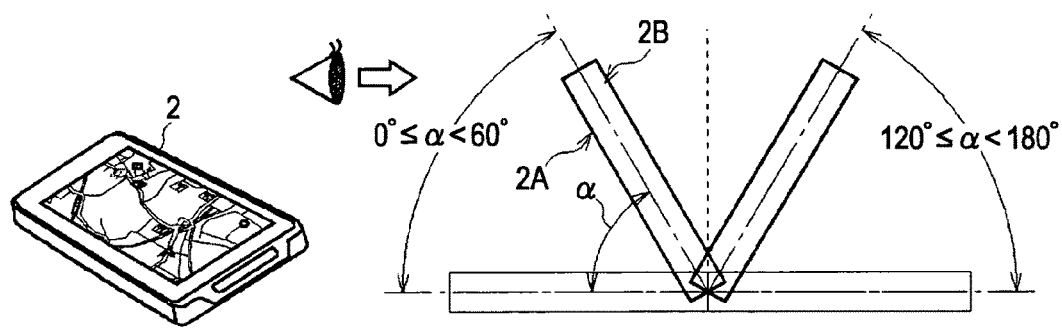

Specifically, as shown in FIG. 5A, if an angle of inclination $\alpha$ is not less than $60[°]$ and less than $120[°]$, the CPU 10 determines that the case 2 is in a state of being raised by the user. On the other hand, as shown in FIG. 5B, if an angle of inclination $\alpha$ is not less than $0[°]$ and less than $60[°]$ or is not less than $120[°]$ and not greater than $180[°]$, the CPU 10 determines that the case 2 is in a state of being laid down by the user.

Figure 4:
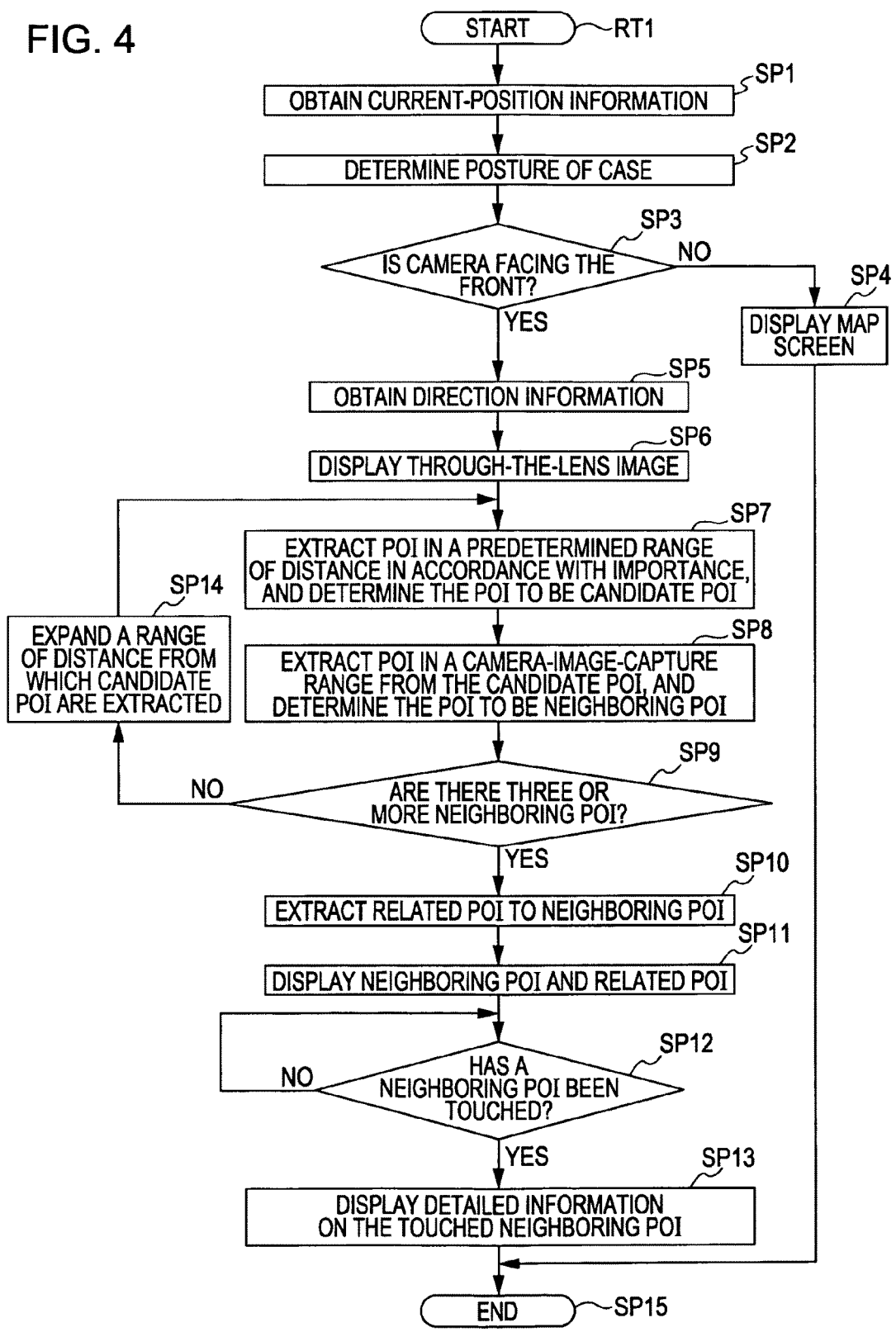
FIG. 4 is a flowchart illustrating a neighboring-POI display processing procedure.

In this manner, the CPU 10 determines in what posture the case 2 is held by the user, and the processing proceeds to the next step SP3 (FIG. 4).

In step SP3, the CPU 10 determines whether the camera section 4 faces the front or not. Specifically, if the case 2 is in a state of being raised as shown in FIG. 5A, the CPU 10 determines that the camera section 4 is facing the front, and if the case 2 is in a state of being laid down as shown in FIG. 5B, the CPU 10 determines that the camera section 4 is not facing the front.

And, in step SP3, if the CPU 10 obtains a negative result that the camera section 4 is not facing the front, the processing proceeds to the next step SP4 (FIG. 4).

Figure 6:
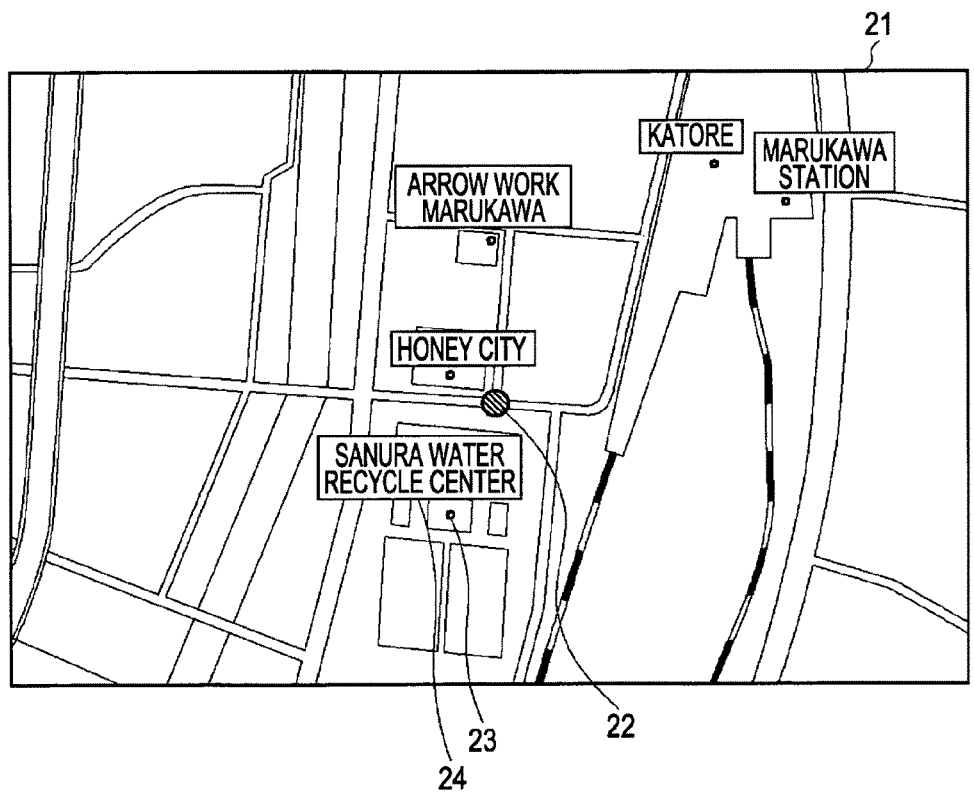
FIG. 6 is a schematic diagram used for explaining a configuration of a map screen.

In step SP4, the CPU 10 displays a map screen 20 showing a neighboring map including the current position of the PND 1 as shown in FIG. 6 on the basis of the current-position information obtained from the GPS unit 13. And the processing proceeds to the next step SP15, and then is terminated.

Specifically, the map screen 20 includes a map image 21 including the current position of the PND 1, a current-position mark 22 indicating the current position, a POI-position mark 23 indicating a position of a POI located in a map shown by the map image 21, and a POI name 24 indicating a name of the POI.

When the CPU 10 detects that, for example, a POI name 24 in the map screen 20 has been selected in response to a user's touch operation on the touch panel 3B, the CPU 10 displays detailed information of the POI indicated by the POI name 24.

In this manner, the PND 1 automatically displays the map screen 20 only by performing a natural operation of laying the case 2 down without performing a touch operation for displaying the map to the user, and allows the user to view and check a neighboring map of the current position and POI.

On the other hand, in step SP3 (FIG. 4), since the camera section 4 is facing the front, an affirmative result is obtained. Thus, in the CPU 10, the processing proceeds to the next step SP5.

In step SP5, the CPU 10 obtains, from the direction sensor 14, direction information indicating a direction in which the camera section 4 captures images, and the processing proceeds to the next step SP6.

In step SP6, the CPU 10 displays a through-the-lens image captured by the camera section 4 at this time on the LCD 3A, and the processing proceeds to the next step SP7.

In step SP7, the CPU 10 selects a POI out of the POI located in a predetermined range of distance, which has been set as a neighborhood of the current position of the PND 1, in accordance with importance set in advance, and extracts the POI as a candidate POI.

Specifically, first, the CPU 10 calculates the distance between the current position of the PND 1 and each POI on the basis of the latitude and longitude information of the current position of the PND 1 obtained from the GPS unit 13 and the latitude and longitude information of each POI, which has been read from the nonvolatile memory 11.

And the CPU 10 extracts individual POI located in a predetermined range of distance Rmin, range of distance Rmid, and range of distance Rmax, which have been set as neighborhoods of the current position of the PND 1 using the distances between the current position of the PND 1 and the individual POI. These ranges of distance are set in three stages of width. The range of distance Rmin is the narrowest, the range of distance Rmax is the widest, and the range of distance Rmid is substantially in the middle of the range of distance Rmin and the range of distance Rmax.

Figure 7:
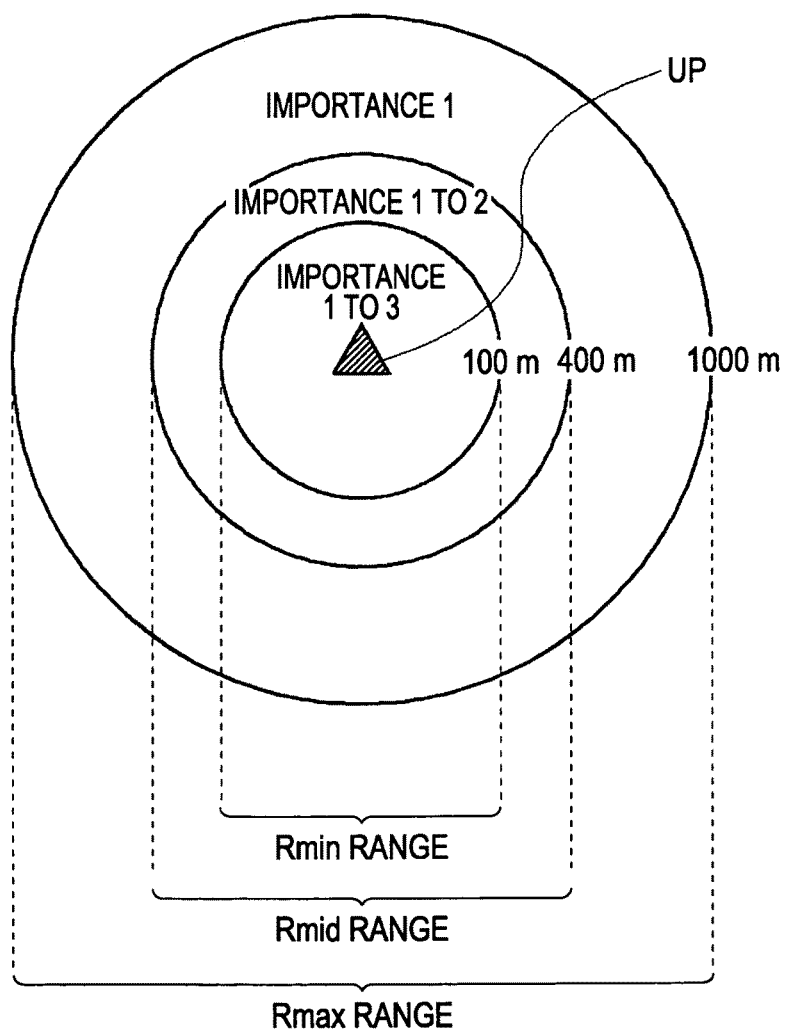
FIG. 7 is a schematic diagram used for explaining a method of extracting POI (1)

As shown in FIG. 7, for example, it is assumed that the range of distance Rmin is set as a range of 100 [m] from a current position UP of the PND 1, the range of distance Rmid is set as a range of 100 [m] to 400 [m] from the current position UP, and the range of distance Rmax is set as a range of 400 [m] to 1000 [m] from the current position UP.

And the CPU 10 extracts a candidate POI in accordance with importance of POI out of the POI extracted from the range of distance Rmin, the range of distance Rmid, and the range of distance Rmax.

Here, importance of POI is set such that, for example, a POI having more importance as a landmark is set to have higher importance. FIG. 8 shows an example of importance of POI. FIG. 8 indicates that the lower a numeric value of importance of POI is, the higher the importance is. For example, a recreational facility, a large-sized office building, a station, a mountain, etc., are set to have the highest importance. Next, importance is set in the order of a middle-sized/small-sized building, a public facility (a post office, a hospital, etc.), and a store (a convenience store, a restaurant, etc.).

Incidentally, importance of a POI is recorded in the nonvolatile memory 11 in advance in connection with each POI as POI information.

Specifically, as shown in FIG. 7, the CPU 10 extracts, for example, 10 candidate POI in the descending order of importance from the POI having importance 1 to 3 out of POI in the range of distance Rmin.

Also, the CPU 10 extracts, for example, 5 candidate POI in the descending order of importance from the POI having importance 1 to 2 out of POI in the range of distance Rmid.

Further, the CPU 10 extracts, for example, 5 candidate POI in the descending order of importance from the POI having importance 1 out of POI in the range of distance Rmax.

In this manner, the CPU 10 extracts even candidate POI having a relatively low importance in a short distance, such as in the range of distance Rmin, and extracts only candidate POI having high importance in a long distance, such as in the range of distance Rmid or in the range of distance Rmax.

And, the CPU 10 extracts candidate POI from POI in the range of distance Rmin, in the range of distance Rmid, and in the range of distance Rmax in accordance with importance of POI, and then the processing proceeds to the next step SP8 (FIG. 4).

Figure 9:
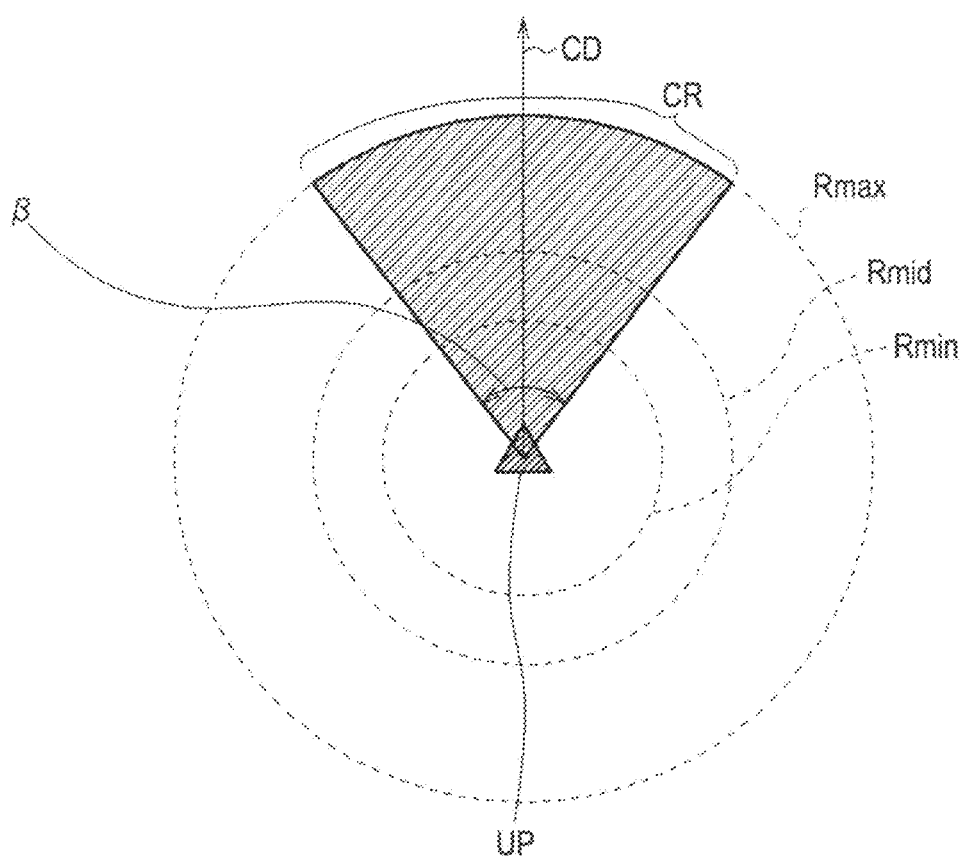
FIG. 9 is a schematic diagram used for explaining a method of extracting POI (2)

In step SP8, as shown in FIG. 9, the CPU 10 further extracts candidate POI located in a range (also referred to as a camera-image-capture range) CR shot by the camera section 4 from the candidate POI extracted in step SP7, and determines them to be neighboring POI.

Specifically, the CPU 10 obtains a direction (also referred to as a camera-image-capture direction) CD in which the camera section 4 is capturing images from the direction information obtained by the direction sensor 14. Also, the CPU 10 obtains an imaging angle of view $\beta$ in which the camera section 4 is capturing images from the camera section 4.

And the CPU 10 determines a fan-shaped range having the current position UP as a center, a camera-image-capture direction CD as a center line, and an imaging angle of view $\beta$ as a central angle to be a camera-image-capture range CR in the range of distance Rmin, the range of distance Rmid, and the range of distance Rmax.

In this manner, the camera-image-capture range CR is not a range that is actually displayed as a through-the-lens image, but a range determined by the camera-image-capture direction CD and the imaging angle of view $\beta$.

Accordingly, if the user has pressed the zoom-in button 5A, and a through-the-lens image in a narrow range is displayed, the imaging angle of view $\beta$ of the camera section 4 is small. Thus, the camera-image-capture range CR also becomes narrow. On the other hand, if the user has pressed the zoom-out button 5B, and a through-the-lens image in a wide range is displayed, the imaging angle of view $\beta$ of the camera section 4 is large. Thus, the camera-image-capture range CR also becomes wide.

And the CPU 10 individually calculates the direction of each candidate POI as viewed from the current position UP on the basis of the latitude and longitude information of each candidate POI extracted in step SP7 and the latitude and longitude information of the current position UP. And the CPU 10 extracts candidate POI located in the camera-image-capture range CR on the basis of the direction of each candidate POI, and determines the POI to be a neighboring POI. After that, the processing proceeds to the next step SP9.

In this manner, the PND 1 finally extracts neighboring POI located in the predetermined range of distance from the current position UP and in the fan-shaped range having a camera-image-capture direction CD as a center line and an imaging angle of view β as a central angle.

In step SP9 (FIG. 4), the CPU 10 determines whether there are, for example, three or more neighboring POI extracted in step SP8. If an affirmative result is obtained, the processing proceeds to the next step SP10.

In step SP10, the CPU 10 extracts the other POI located in a same place as the extracted neighboring POI as POI related to the neighboring POI (also referred to as a related POI), and the processing proceeds to the next step SP11.

Specifically, the CPU 10 searches for the other POI having same latitude and longitude information as that of the extracted neighboring POI in step SP8 from a plurality of POI recorded in the nonvolatile memory 11, and determines them as the related POI of that neighboring POI.

In step SP11, the CPU 10 displays a neighboring-POI display screen 30 indicating information on the neighboring POI and the related POI extracted in the above-described step SP8 and step SP10.

Figure 10A:
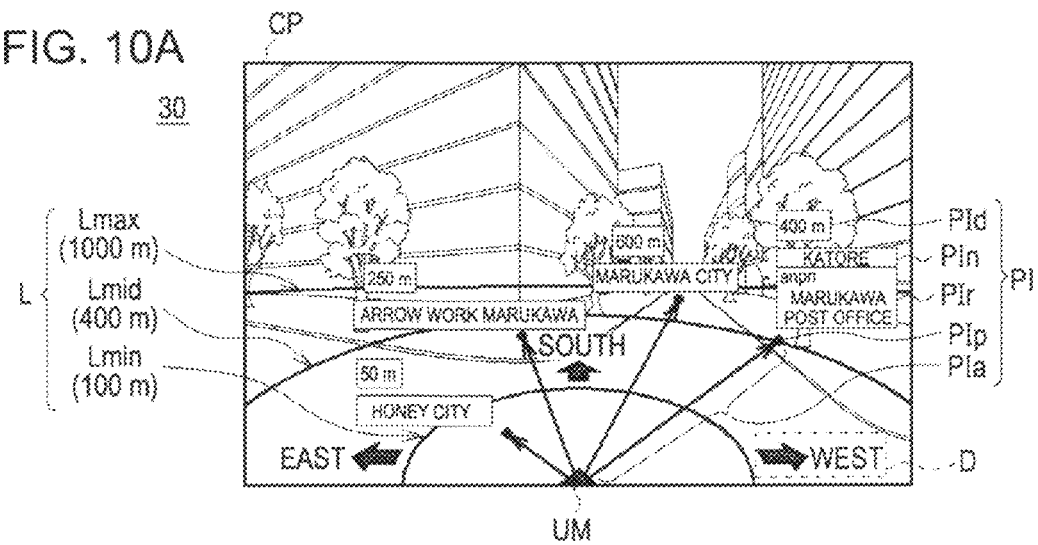
FIGS. 10A and 10B are schematic diagrams used for explaining a neighboring-POI display screen (1)
Figure 10B:
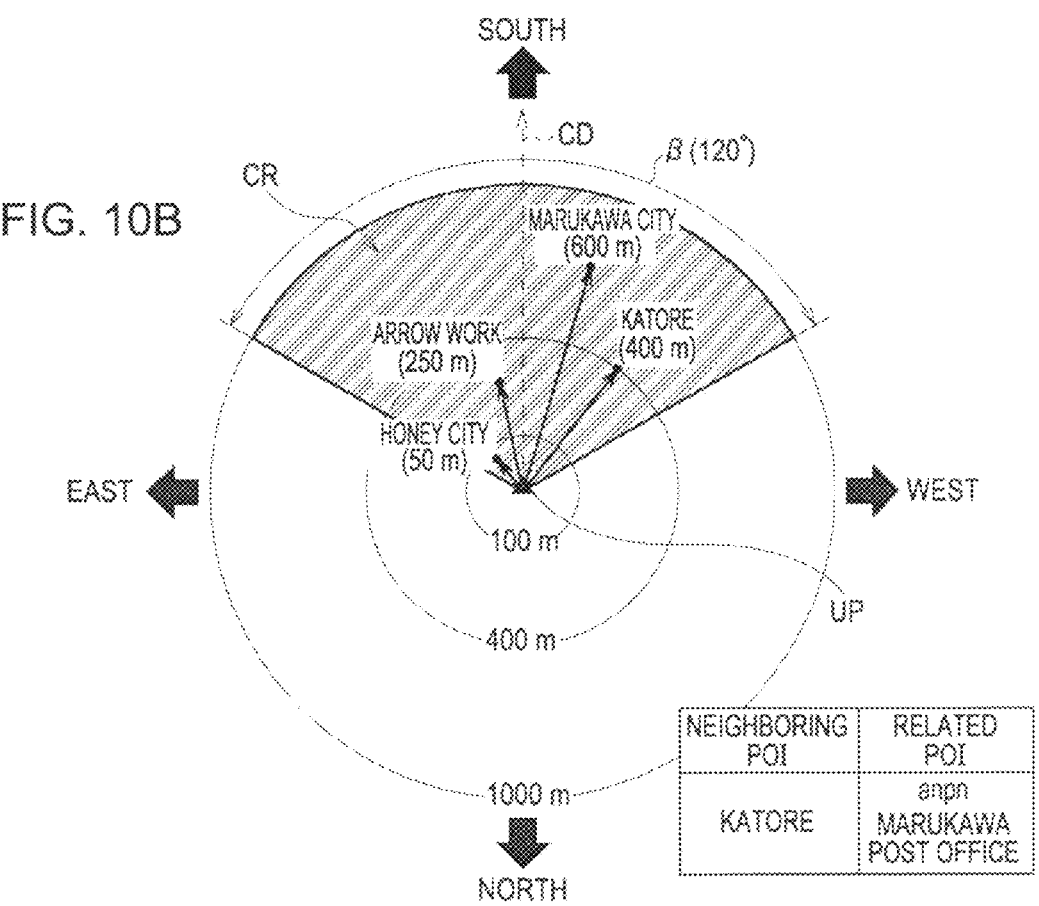

Specifically, FIG. 10A illustrates an example of the neighboring-POI display screen 30, and FIG. 10B illustrates a diagram showing a positional relationship between the neighboring POI extracted at this time and the current position UP.

As shown in FIG. 10B, at this time, it is assumed that the CPU 10 has obtained that the camera-image-capture direction CD is the south, and the imaging angle of view β is about 120[°], and has extracted "Honey City", "Arrow Work Marukawa", "Marukawa City", "Katore" as neighboring POI.

And, the CPU 10 calculates in which direction each of the neighboring POI is located as viewed from the current position UP, and how far each of the neighboring POI is from the current position UP on the basis of the latitude and longitude information of the current position UP and the latitude and longitude information of each of the neighboring POI.

At this time, it is assumed that the CPU 10 has calculated that "Honey City" is located at a distance of about 50 [m] from the current position UP in substantially the southeast direction, and "Arrow Work Marukawa" is located at a distance of about 250 [m] from the current position UP in substantially the south-southeast direction. Also, it is assumed that the CPU 10 has calculated that "Marukawa City" is located at a distance of about 600 [m] from the current position UP in substantially the south-southwest direction, and "Katore" is located at a distance of about 400 [m] from the current position UP in substantially the southwest direction.

Also, at this time, it is assumed that the CPU 10 has extracted, for example, "anpn" and "Marukawa Post Office" as related POI of "Katore".

And, the CPU 10 displays the through-the-lens image CP obtained through the camera section 4 on the entire neighboring-POI display screen 30 shown in FIG. 10A.

And, in the neighboring-POI display screen 30, the CPU 10 determines the middle of the base of the screen to be the current position UP on the screen, and displays a current-position mark UM indicating the current position UP on the through-the-lens image CP.

Also, at this time, the camera-image-capture direction CD is the south, and thus the upward direction of the neighboring-POI display screen 30 becomes the south, the rightward direction is the west, and the left direction is the east. Accordingly, the CPU 10 displays an upward arrow, a rightward arrow, and a leftward arrow on the through-the-lens image CP with the current-position mark UM as center as direction information D in the neighboring-POI display screen 30. Further, the CPU 10 displays characters "south", "west", and "east" near the start points of the individual arrows as direction information D.

Also, the CPU 10 displays, on the neighboring-POI display screen 30, distance lines L, which are reference lines indicating distances between the current position UP and the neighboring POI, on the through-the-lens image CP. The distance lines L include a distance line Lmin, which indicates a short distance from the current position UP, a distance line Lmid, which indicates a middle distance from the current position UP, and a distance line Lmax, which indicates a long distance from the current position UP. These lines individually correspond to the range of distance Rmin, the range of distance Rmid, and the range of distance Rmax, which have been used for extracting the candidate POI in step SP8.

At this time, in FIG. 10A, the distance lines L include the distance line Lmin, which indicates a distance of 100 [m] from the current position UP, the distance line Lmid, which indicates a distance of 400 [m] from the current position UP, and the distance line Lmax, which indicates a distance of 1000 [m] from the current position UP. These correspond to the range Rmin (100 [m] range), the range Rmid (100 to 400 [m] range), and the range Rmax (400 to 1000 [m] range) used at this time in step SP8, respectively.

In this regard, the distance lines L do not indicate actual distances on the through-the-lens image CP, but indicate as rough standard distances between the current position UP and the neighboring POI.

Also, the CPU 10 displays the distance line Lmin, the distance line Lmid, and the distance line Lmax on the neighboring-POI display screen 30 using a perspective view of concentric circles (radii of 100 [m], 400 [m], and 1000 [m]) surrounding the current position UP shown in FIG. 10B.

Here, a more detailed description will be given of a method of displaying the distance lines L using FIGS. 11A, 11B, and 11C.

Figure 11A:
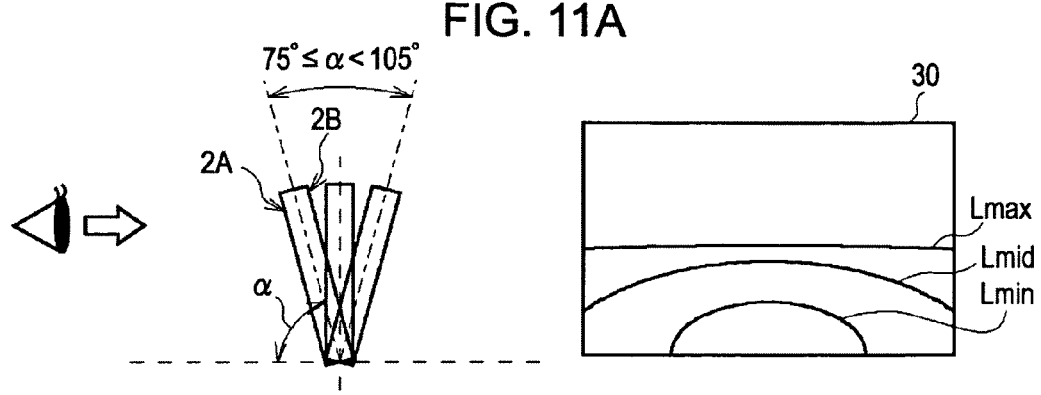
FIGS. 11A, 11B, and 11C are schematic diagrams used for explaining a method of displaying distance lines.

FIG. 11A illustrates the case where the camera section 4 is capturing an image of a front scene. Capturing an image of a front scene means here that the case 2 is in a state of having an angle of inclination α of not less than 75[°] and less than 105[°]. In this case, in a scene displayed by the camera section 4 as a through-the-lens image, the horizon is assumed to lie on a position substantially dividing the screen into halves vertically. Thus, the CPU 10 displays the distance line Lmax indicating a far distance at that position. And, the CPU 10 displays the distance line Lmin and the distance line Lmid in accordance with the position of the distance line Lmax.

Figure 11B:
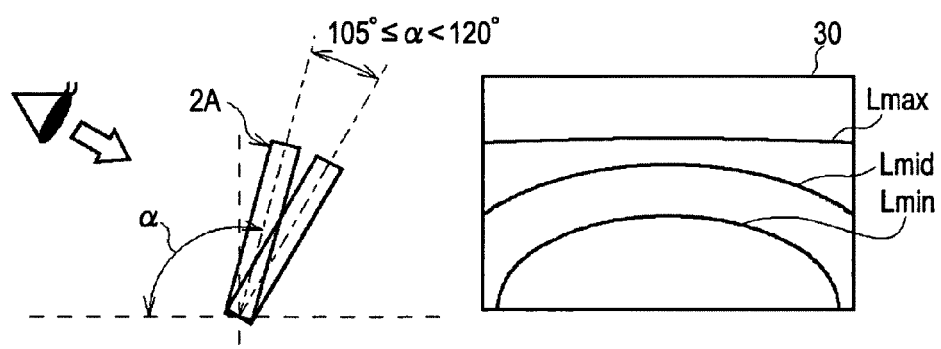

Also, FIG. 11B illustrates the case where the camera section 4 is capturing an image of a diagonally lower scene. Capturing an image of a diagonally lower scene means here that the case 2 is in a state of having an angle of inclination α of not less than 105[°] and less than 120[°]. In this case, in a scene displayed by the camera section 4 as a through-the-lens image, the horizon is assumed to lie at a position in the upper part of the screen. Thus, the CPU 10 displays the distance line Lmax indicating a far distance at a position of about ¼ from the top. And, the CPU 10 displays the distance line Lmin and the distance line Lmid in accordance with the position of the distance line Lmax.

Figure 11C:
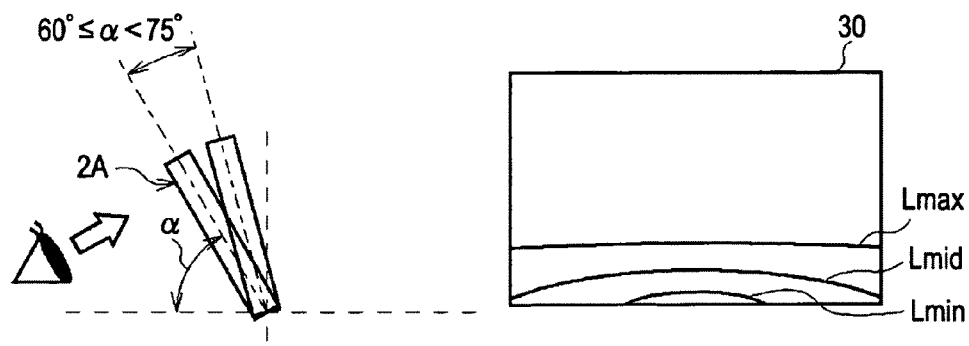

Also, FIG. 11C illustrates the case where the camera section 4 is capturing an image of a diagonally upper scene. Capturing an image of a diagonally upper scene means here that the case 2 is in a state of having an angle of inclination α of not less than 60[°] and less than 75[°]. In this case, in a scene displayed by the camera section 4 as a through-the-lens image, the horizon is assumed to lie at a position in the lower part of the screen. Thus, the CPU 10 displays the distance line Lmax indicating a far distance at a position of about ¼ from the bottom. And, the CPU 10 displays the distance line Lmin and the distance line Lmid in accordance with the position of the distance line Lmax.

In this manner, the CPU 10 determines whether from a front scene, or from a diagonally upper scene, or from a diagonally lower scene, the camera section 4 is capturing an image, and displays the distance lines L at predetermined positions in accordance with the determination result on the basis of the angle of inclination α of the case 2.

Further, in the neighboring-POI display screen 30 (FIG. 10A), the CPU 10 displays a neighboring-POI display group PI indicating information on the neighboring POI on the through-the-lens image CP on the basis of the POI information of the neighboring POI recorded in the nonvolatile memory 11.

First, the CPU 10 displays a neighboring-POI position mark PIp indicating a neighboring-POI position as a neighboring-POI display group PI. The CPU 10 displays the neighboring POI-position mark PIp at a position corresponding to the direction of the neighboring POI as viewed from the current position UP and the distance between the current position UP and the neighboring POI on the neighboring-POI display screen 30 in accordance with the distance lines L on the basis of the current-position mark UM.

For example, "Katore" is located at a position 400 [m] apart from the current position UP, and thus the CPU 10 displays a neighboring-POI position mark PIp on the distance line Lmid indicating 400 [m]. Also, "Katore" is located in the southwest direction from the current position UP, and thus the CPU 10 displays a neighboring-POI position mark PIp at the diagonally right of the current-position mark UM in the southwest of the neighboring-POI display screen 30).

Also, for example, "Marukawa City" is located at a distance 600 [m] apart from the current position UP, and the CPU 10 displays a neighboring-POI position mark PIp at the outside of the distance line Lmid (400 [m]) and inside of the distance line Lmax (1000 [m]).

Also, the CPU 10 displays an arrow PIa indicating in which direction a neighboring POI is located as viewed from the current position UP as a neighboring-POI display group PI. The CPU 10 displays the arrow PIa such that the arrow PIa connects the current position mark UM and the position mark PIp of the neighboring POI with the current position mark UM as a start point and the neighboring POI position mark PIp as an end mark. Accordingly, the angle of the arrow PIa shows in which direction the neighboring POI is located as viewed from the current position UP. Also, the length of the arrow PIa is proportional to the distance between the current position UP and the neighboring POI, and shows the distance between the current position UP and the neighboring POI in accordance with the distance lines L.

Further, the CPU 10 displays, as the neighboring-POI display group PI, a name PIn indicating the name of the neighboring POI, and a distance PId indicating the distance from the current position UP. The CPU 10 displays the name PIn near the neighboring POI position mark PIp on neighboring-POI display screen 30, and the distance PId above the name. For example, as shown in FIG. 10A, the CPU displays "Katore", which is the name PIn of "Katore", near the neighboring-POI position mark PIp, and displays "400 m", which is the distance PId of "Katore", above the name.

Further, the CPU 10 displays, as the neighboring-POI display group PI, a related POI list PIr indicating a list of the related POI. The CPU 10 displays the related POI list PIr below the name PIn on the neighboring-POI display screen 30. For example, the related POI of "Katore" are "anpn" and "Marukawa Post Office", and thus as shown in FIG. 10A, the CPU 10 list-displays the related POI "anpn" and "Marukawa Post Office" below the name PIn of "Katore".

In this manner, the CPU 10 displays information regarding the neighboring POI on the through-the-lens image CP captured by the camera section 4 on the neighboring-POI display screen 30.

And after the CPU 10 displays such a neighboring-POI display screen 30 on the LCD 3A, the processing proceeds to the next step SP12 (FIG. 4).

In step SP12, the CPU 10 waits for a touch operation on the name PIn of the touch panel 35B. If a touch operation has been detected, the processing proceeds to the next step SP13.

Figure 12:
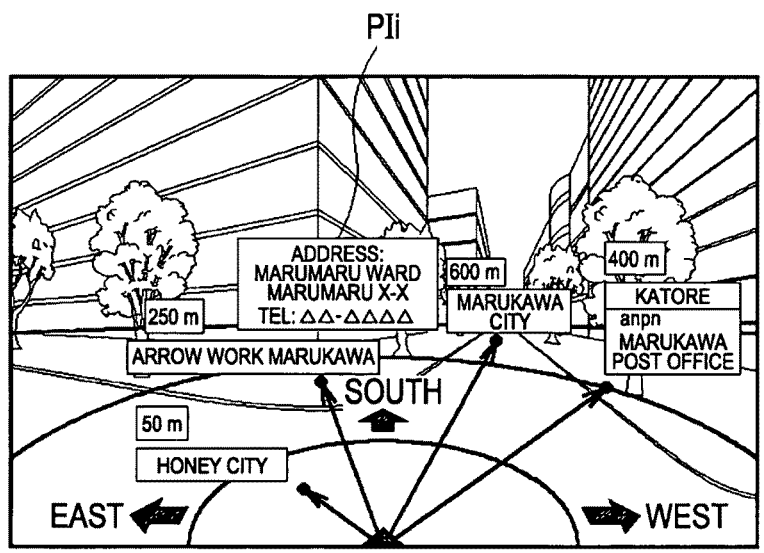
FIG. 12 is schematic diagram used for explaining a neighboring-POI display screen (2)

In step SP13, as shown in FIG. 12, the CPU 10 displays detailed information PIi indicating detailed information on the POI indicated by the touched name PIn (here, "Marukawa City") near the name PIn. Detailed information on a POI includes an address, a telephone number, etc., which is based on the POI information of the POI recorded in the nonvolatile memory 11. Also, the CPU 10 displays the detailed information PIi at a position so that the information does not overlap the other neighboring-POI display group PI.

In this manner, the CPU 10 displays the detailed information PIi on the touched neighboring POI, then the processing proceeds to the next step SP15 (FIG. 4), and the processing is terminated.

Incidentally, in step SP9, if the number of the neighboring POI extracted in step SP8 is two or less so that a negative result is obtained, the processing proceeds to the next step SP14. The case where the number of the neighboring POI is two or less includes, for example, being in a mountainous area, etc. In a mountainous area, etc., there are fewer POI compared with an urban area, and thus the number of extracted neighboring POI is considered to be few.

In step SP14, the CPU 10 expands the range of distance in which candidate POI are extracted in order to increase the number of extracted neighboring POI.

The range of distance in which candidate POI are extracted is the range of distance Rmin, the range of distance Rmid, and the range of distance Rmax, which have been used in the above-described step SP7. In step SP7, the CPU 10 has determined that the range of distance Rmin to be a range of 100 [m] from the current position UP, the range of distance Rmid to be a range of 100 to 400 [m] from the current position UP, and the range of distance Rmax to be a range of 400 to 1000 [m] from the current position UP. And the CPU 10 has extracted POI located individually in the range of distance Rmin, the range of distance Rmid, and the range of distance Rmax, and determined the POI to be candidate POI.

However, at this time, if it is assumed that the CPU extracts only two neighboring POI or less from the candidate POI, the CPU 10 expands the range of distance Rmin, the range of distance Rmid, and the range of distance Rmax so as to extract three neighboring POI or more. The CPU 10, for example, individually doubles the range of distance Rmin, the range of distance Rmid, and the range of distance Rmax, and the processing returns to step SP7 again.

In step SP7, in the same manner as described above, the CPU 10 extracts candidate POI out of individual POI in the range of distance Rmin, the range of distance Rmid, and the range of distance Rmax in accordance with importance, and the processing proceeds to the next step SP8.

In step SP8, in the same manner as described above, the CPU 10 further extracts candidate POI located in the camera-image-capture range CR out of the candidate POI, and determines the POI to be neighboring POI, and the processing proceeds to the next step SP9.

In step SP9, in the same manner as described above, the CPU 10 determines whether there are three or more neighboring POI. If a negative result is obtained, the processing proceeds to step SP14, and further the CPU 10 expands the range of distance in which the candidate POI are extracted.

In this manner, the CPU 10 repeats steps SP7, SP8, SP9 and SP14 until three or more neighboring POI are extracted.

Thereby, it is possible for the PND 1 to display neighboring POI of a predetermined number or more without fail. For example, if a user is climbing a mountain, etc., and thus there are only a few POI near the user, it is possible to provide the user with information of neighboring POI of a predetermined number or more.

Figure 13A:
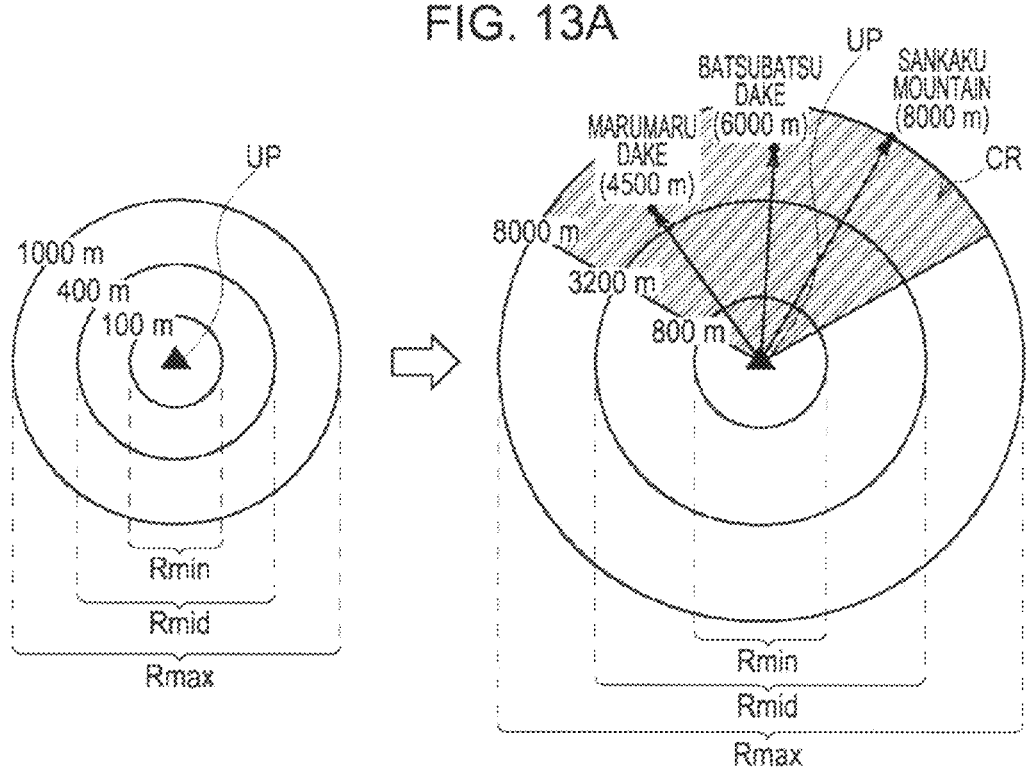
FIGS. 13A and 13B are schematic diagrams used for explaining a neighboring-POI display screen (3)

Also, for example, it is assumed that the CPU 10 has repeated steps SP7, SP8, SP9 and SP14 for several times, then, as shown in FIG. 13A, the range of distance Rmin, the range of distance Rmid and the range of distance Rmax have become 8 times as those of the first time, and thus three or more neighboring POI have been extracted.

At this time, in the same manner as above-described, the CPU 10 performs processing in steps SP9 to SP10, and displays the neighboring-POI display screen 30 (FIG. 13B) on the LCD 3A in step SP11.

Figure 13B:
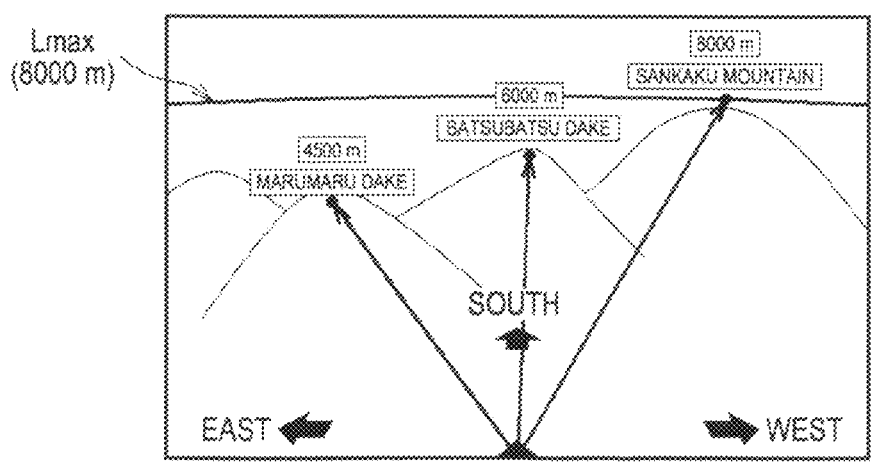

Incidentally, it is assumed here that as shown in FIG. 13A, no neighboring POI have been extracted in the range of distance Rmid and the range of distance Rmin. In such a case, as shown in FIG. 13B, the distance line Lmid and the distance line Lmin corresponding to the range of distance Rmid and the range of distance Rmin, respectively, are omitted in the display. Thereby, the CPU 10 can reduce excessive information on the neighboring-POI display screen 30, and it becomes possible to make the neighboring-POI display screen 30 easy to see.

In this manner, after the processing in the CPU 10 has completed step SP11, in the same manner as above-described, the processing in steps SP12, SP13, and SP15 is performed, and the processing is terminated.

1.4 Operation and Advantages

In the above configuration, the CPU 10 of the PND 1 extracts POI located in the neighborhood of the current position and in the camera-image-capture range CR, which is determined by the camera section direction CD and the imaging angle of view β, from the nonvolatile memory 11 as neighboring POI.

Thereby, the CPU 10 of the PND 1 can extract neighboring POI in accordance with the direction in which the through-the-lens image is displayed and the size of the range, and thus can provide the user with information on the neighboring POI corresponding to the through-the-lens image that the user is viewing and checking.

Also, the CPU 10 of the PND 1 displays distance lines L indicating the distance from the current position on the through-the-lens image on neighboring-POI display screen 30. Also, the CPU 10 of the PND 1 displays a neighboring POI position mark PIp indicating the location of the neighboring POI at a position corresponding to the distance and the direction from the current position to the neighboring POI on the through-the-lens image on the neighboring-POI display screen 30.

Thereby, the CPU 10 of the PND 1 allows the user to recognize the distance and the direction of the neighboring POI in accordance with the distance line L indicating the distance from the current position on the through-the-lens image that the user is viewing and checking. Accordingly, the CPU 10 of the PND 1 allows the user to easily recognize where the neighboring POI is actually located as viewed from the user.

Also, the CPU 10 of the PND 1 displays an arrow PIa connecting the current position mark UM indicating the current position and the neighboring POI position mark PIp indicating the position of the neighboring POI on the through-the-lens image on the neighboring-POI display screen 30.

Thereby, the CPU 10 of the PND 1 can guide the user toward the neighboring POI on the through-the-lens image that the user is viewing and checking.

Also, if the CPU 10 of the PND 1 has extracted a predetermined number of neighboring POI or less, the CPU 10 of the PND 1 expands the ranges of distance Rmin, Rmid, and Rmax, which have been set as the neighborhood of the current position. And the CPU 10 of the PND 1 extracts POI located in the camera-image-capture range CR determined by the expanded ranges of distance, and determines the POI as neighboring POI.

Thereby, the CPU 10 of the PND 1 can display a predetermined number of neighboring POI or more without fail. For example, if the user is climbing a mountain, etc., and there are only a few POI near the user, it is possible to provide the user with information of a predetermined number of neighboring POI or more without fail.

Also, the CPU 10 of the PND 1 determines whether the camera section 4 is facing the front on the basis of the angle of inclination α of the case 2. And if the CPU 10 of the PND 1 determines that the camera section 4 is facing the front, the CPU 10 displays the neighboring-POI display screen 30. If the CPU 10 determines that the camera section 4 is not facing the front, the CPU 10 displays the map screen 20 indicating a neighboring map of the current position.

Thereby, the CPU 10 of the PND 1 can display the neighboring-POI display screen 30 in response to a user's natural operation of raising the case 2 such that the camera section 4 faces the front in order to capture an image of a neighboring scene. Also, thereby, the CPU 10 of the PND 1 can display the map screen 20 in response to a user's natural operation of laying the case 2 down in order to check the map.

Thus, the CPU 10 of the PND 1 can provide the user with information in accordance with only a user's natural operation without any touch operation by the user.

With the above configuration, the PND 1 allows the user to recognize the distance and the direction of the neighboring POI in accordance with the distance line L indicating the distance from the current position on the through-the-lens image that the user is viewing and checking. Thus, the PND 1 allows the user to easily recognize where the neighboring POI is actually located as viewed from the user.

2. Another Embodiment

In this regard, in the above-described embodiment, a description has been given of the case where the range of distance in which candidate POI are extracted is expanded in order to increase the number of extracted neighboring POI in step SP14 of the neighboring-POI display processing procedure (routine RT1).

However, the present invention is not limited to this. The CPU 10 of the PND 1 may not expand the range of distance in which candidate POI are extracted in step SP14, but may increase the imaging angle of view β in order to expand the camera-image-capture range CR.

Figure 14:
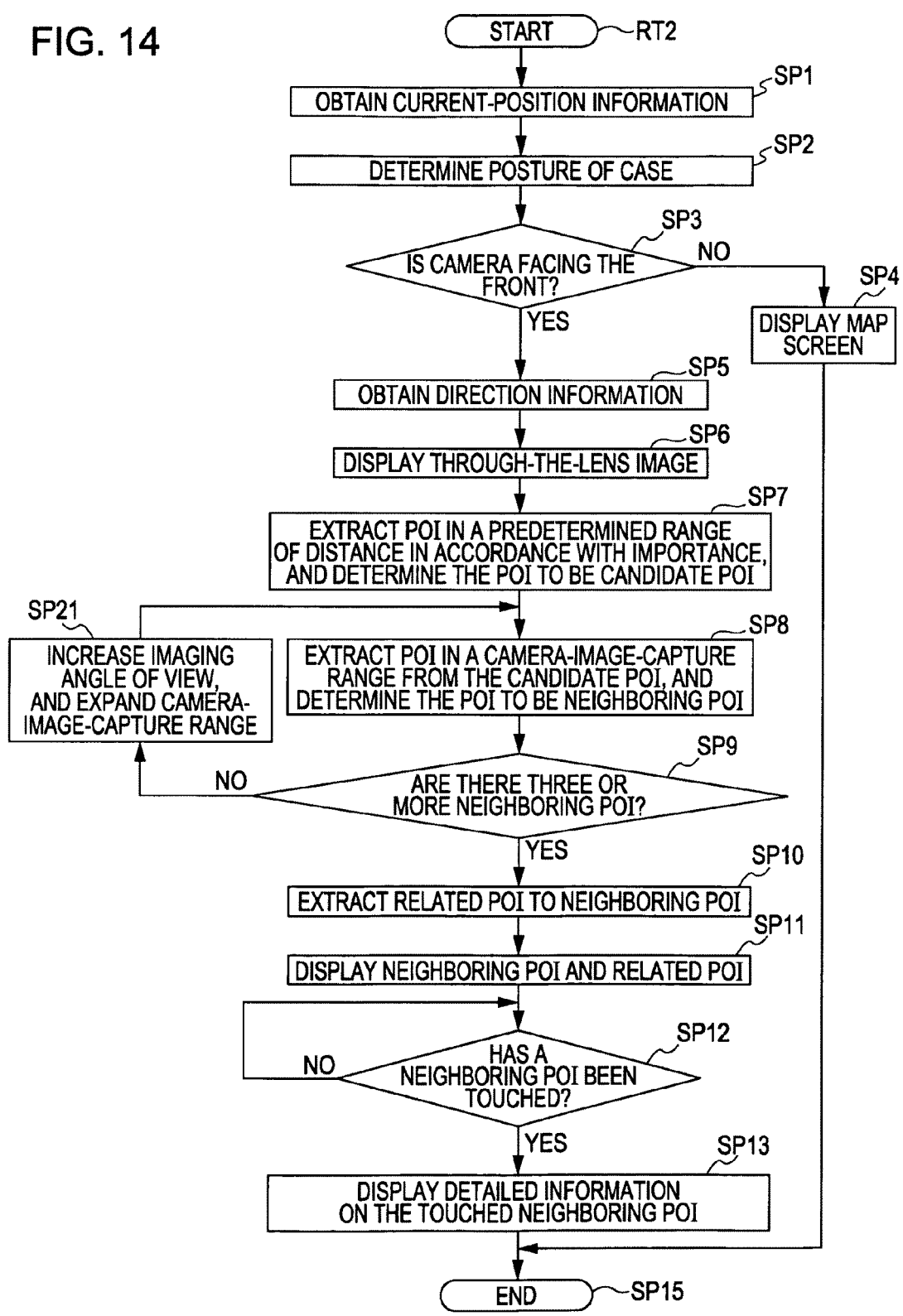
FIG. 14 is a flowchart illustrating a neighboring-POI display processing procedure according to another embodiment.

A detailed description will be given of the neighboring-POI display processing procedure (routine RT2) of this case using a flowchart shown in FIG. 14. Incidentally, in the neighboring-POI display processing procedure RT2 shown in FIG. 14, a same reference numeral or letter is given to a same step as that in the neighboring-POI display processing procedure RT1 of the embodiment described above.

In the CPU 10, the processing enters the start step of a routine RT2 and proceeds to the next step SP1. In the same manner as the neighboring-POI display processing procedure RT1 in the above-described embodiment, the processing from step SP1 to step SP8 is performed, and then the processing proceeds to step SP9. That is to say, from step SP1 to step SP8, the CPU 10 extracts candidate POI from the POI in a predetermined range of distance from the current position of the PND 1 in accordance with importance, and then extracts POI in the camera-image-capture range CR out of the candidate POI as neighboring POI.

And, in step SP9, the CPU 10 determines whether there are three or more neighboring POI extracted in step SP9. If a negative result is obtained, the processing proceeds to the next step SP21.

In step SP21, the CPU 10 increases the imaging angle of view β so as to expand the camera-image-capture range CR in order to increase the number of extracted neighboring POI. The processing returns to step SP8, and the CPU 10 extracts candidate POI located in the expanded camera-image-capture range CR as neighboring POI.

Figure 15A:
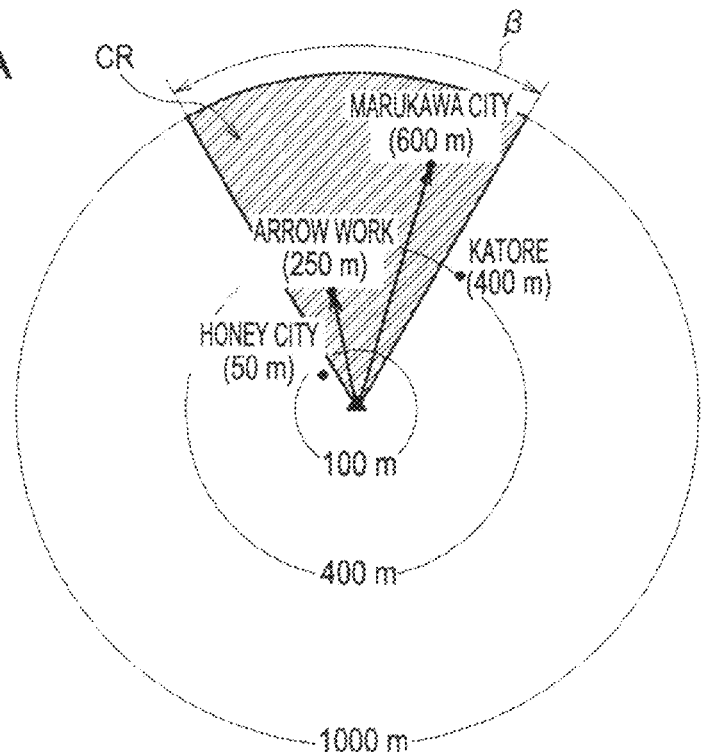
FIGS. 15A and 15B are schematic diagrams used for explaining a method of extracting POI, according to another embodiment.

Specifically, for example, as shown in FIG. 15A, it is assumed that the CPU 10 has extracted "Honey City", "Arrow Work Marukawa", "Marukawa City", and "Katore" as candidate POI, but "Honey City" and "Katore" are not included in the camera-image-capture range CR. At this time, in step SP8, the CPU 10 extracts only "Arrow Work Marukawa" and "Marukawa City" as neighboring POI.

Figure 15B:
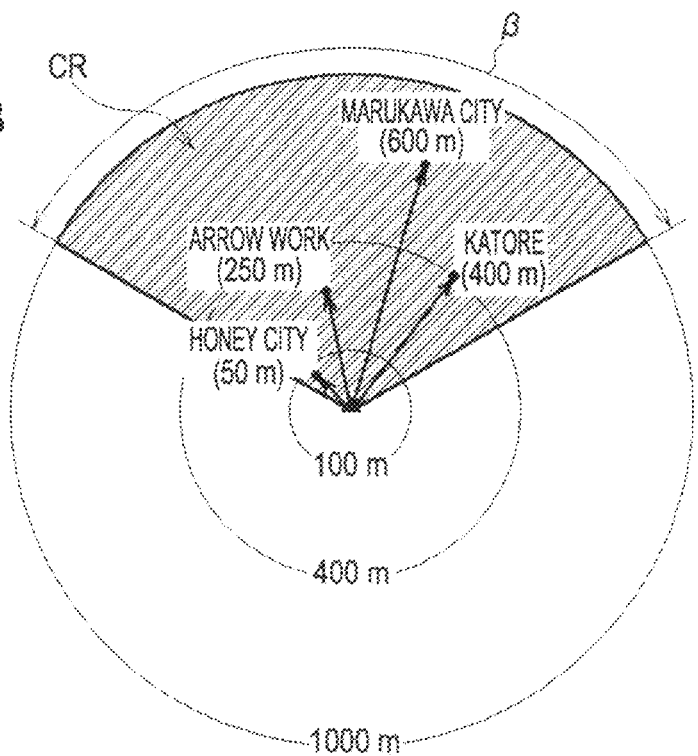

Here, in step SP21, the CPU 10 increases the imaging angle of view β so as to expand the camera-image-capture range CR. Thus, as shown in FIG. 15B, "Honey City" and "Katore" come to be included in the camera-image-capture range CR. Then, in the nest step SP8 (FIG. 14), the CPU 10 can newly extracts "Honey City" and "Katore" as neighboring POI. As a result, it is possible to increase the number of neighboring POI to be extracted.

And, the CPU 10 repeats steps SP8, SP9 and SP14 until three or more neighboring POI are extracted. Thereby, it is possible for the PND 1 to display neighboring POI of a predetermined number or more without fail. Accordingly, it is possible to provide the user with information on a predetermined number of the neighboring POI or more without fail.

And, in the CPU 10, in the same manner as in the above-described embodiment, the processing in step SP9 to step SP13 and step SP15 is performed, and the processing is terminated.

Also, in the above-described embodiment, a description has been given of the case where if the number of the extracted neighboring POI is two or less, the CPU 10 automatically expands the range of distance in which the candidate POI are extracted.

However, the present invention is not limited to this. The CPU 10 may expand or contract the range of distance in which candidate POI is extracted in accordance with a user's operation.

Figure 16:
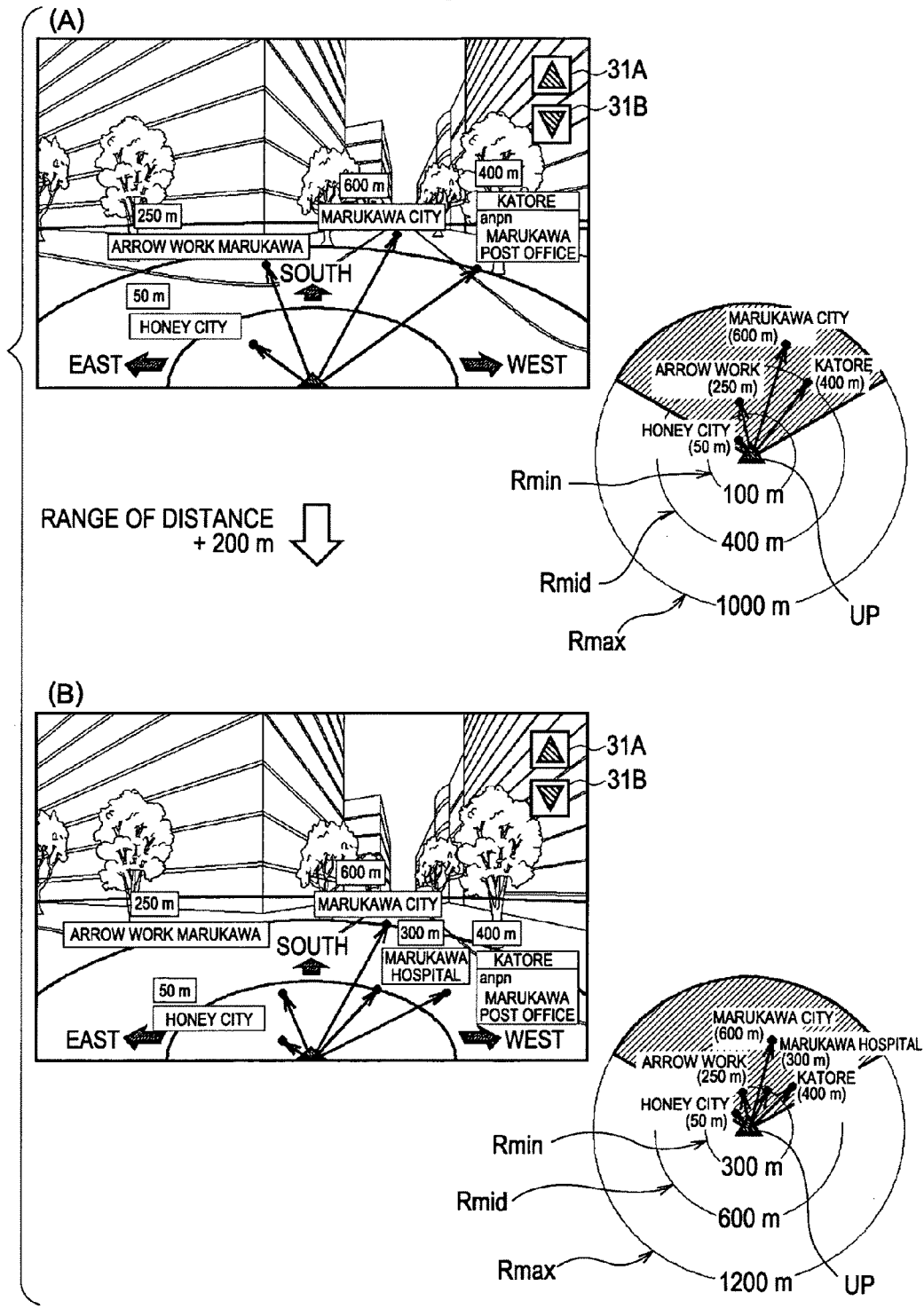
FIG. 16 is a schematic diagram used for explaining a neighboring-POI display screen according to another embodiment.

In this case, for example, as shown in FIG. 16(A), a range-of-distance expansion button 31A and a range-of-distance contraction button 31B are disposed at the upper right of the neighboring-POI display screen 30. If the range-of-distance expansion button 31A is selected in accordance with a user's touch operation range of distance, the CPU 10 expands the range of distance (ranges of distance Rmin, Rmid, and Rmax) in which the candidate POI are extracted, for example, by 200 [m].

As shown in FIG. 16(A), it is assumed that for example, the range of distance Rmin is a range of 100 [m] from the current position UP, the range of distance Rmid is a range of 100 to 400 [m] from the current position UP, and the range of distance Rmax is a range of 400 to 1000 [m] from the current position UP. Here, if the range-of-distance expansion button 31A is selected, as shown in FIG. 16(B), the range of distance Rmin becomes a range of 300 [m] from the current position UP, the range of distance Rmid becomes a range of 300 to 600 [m] from the current position UP, and the range of distance Rmax becomes a range of 600 to 1200 [m] from the current position UP.

At this time, it is assumed that, for example, a POI "Marukawa Hospital" having importance 3 is located at a point 300 [m] apart from the current position UP. Also, "Marukawa Hospital" is assumed to be located in the camera-image-capture range CR.

As described above, the CPU 10 extracts only POI having importance of 1 and 2 from the range of distance Rmid, but extracts POI having importance of 1 to 3 from the range of distance Rmin. At this time, before the range-of-distance expansion button 31A is selected, "Marukawa Hospital" is not extracted as neighboring POI, because "Marukawa Hospital" is in the range of distance Rmid (rang of 100 to 400 [m]). However, if the range-of-distance expansion button 31A is selected, the range of distance Rmin is expanded, and thus "Marukawa Hospital" becomes included in the range of distance Rmin (range of 300 [m]). Accordingly, as shown in FIG. 16(B), "Marukawa Hospital" is extracted as a neighboring POI.

Accordingly, if the user is assumed to be looking for the hospital at this time, by selecting the range-of-distance expansion button 31A, the user is allowed to display "Marukawa Hospital" on the neighboring-POI display screen 30 (FIG. 16(B)), and thus allowed to check a targeted neighboring POI.

In this manner, if the user selects the range-of-distance expansion button 31A, the PND 1 expands the range from which neighboring POI is extracted. As a result, the number of neighboring POI to be extracted can be increased, and thus the number of neighboring POI displayed on the neighboring-POI display screen 30 can be increased.

Thereby, the PND 1 allows the user to select the range-of-distance expansion button 31A in order to search for a targeted neighboring POI even if there is not a user's targeted neighboring POI on the neighboring-POI display screen 30 that has been displayed in the first place.

On the other hand, if the range-of-distance contraction button 31B is selected in accordance with a user's touch operation, the CPU 10 contracts the range of distance (the ranges of distance Rmin, Rmid, and Rmax) from which the candidate POI are extracted, for example, by 200 [m].

y this means, the CPU 10 can reduce the number of extracted neighboring POI, and thus can reduce the number of neighboring POI displayed on the neighboring-POI display screen 30. Accordingly, even if the user feels that there are too many neighboring POI on the neighboring-POI display screen 30 to see, the PND 1 allows the user to select the range-of-distance contraction button 31B, and to make the neighboring-POI display screen 30 easy to see in accordance with user's preference.

Further, in the above-described embodiment, a description has been given of the case where importance of POI is recorded in the nonvolatile memory 11 in advance. The present invention is not limited to this. Importance of POI may not be recorded in advance, and the CPU 10 may determine importance of POI on the basis of POI information, such as genre, an icon image, etc., when the CPU 10 extracts a neighboring POI.

For example, among POI, there are POI having an icon image for displaying the POI on a map as POI information. Thus, the CPU 10 determines that, for example, POI having an icon image as POI information is a major POI, and importance of that POI is high.

Further, in the above-described embodiment, a description has been given of the case where POI is information of a point, and only one piece of latitude and longitude information is recorded for one POI. The present invention is not limited to this. For a POI extending over a certain wide range, such as a mountain, a large-sized recreational facility, etc., information indicating the range of the POI may be recorded. For example, as information indicating a range of a POI, a plurality of pieces of latitude and longitude information may be recorded in connection with the POI. In this manner, the CPU 10 can more correctly extract POI in the neighborhood of the PND 1 as neighboring POI.

Further, in the above-described embodiment, a predetermined ranges of distance (the ranges of distance Rmin, Rmid, and Rmax) are used as the ranges of distance in which the CPU 10 extracts candidate POI. The present invention is not limited to this. The CPU 10 may determine a range of distance in which candidate POI is extracted in accordance with the current position of the PND 1.

In this case, for example, the CPU 10 determines whether the current position of the PND 1 is in an urban area or a mountainous area on the basis of the current position information of the PND 1 obtained by the GPS unit 13 and the map data recorded in the nonvolatile memory 11. And, if the current position of the PND 1 is in an urban area, it is assumed that there are a lot of POI in the vicinity. Thus, the CPU 10 narrows the range of distance in which candidate POI are extracted. On the other hand, if the current position of the PND 1 is in a mountainous area, it is assumed that there are only a few POI in the vicinity. Thus, the CPU 10 widens the range of distance in which candidate POI are extracted.

Further, in the above-described embodiment, the CPU 10 displays the arrow PIa connecting the current position mark UM and the neighboring-POI position mark PIp on the through-the-lens image on the neighboring-POI display screen 30. However, the present invention is not limited to this, and the arrow PIa may not be displayed.

Further, in the above-described embodiment, a description has been given of the case where the CPU 10 of the PND 1 executes the neighboring-POI display processing procedure of the above-described routine RT1 in accordance with a pre-installed application program.

However, the present invention is not limited to this.

The CPU 10 of the PND 1 may execute the neighboring-POI display processing procedure of the above-described routine RT1 in accordance with an application program installed through various routes. For example, the CPU 10 may execute the neighboring-POI display processing procedure of the above-described routine RT1 in accordance with an application program installed from a predetermined recording medium, or an application program downloaded from the Internet.

Further, in the above-described embodiment, a description has been given of the case where the PND 1 as a navigation apparatus according to the present invention includes the GPS unit 13 as a current-position information acquisition section, the camera section 4 as a camera section, the direction sensor 14 as a direction detection section, the acceleration sensor 15 as a direction determination section, the CPU 10 as a direction determination section, a characteristic-point information extraction section and a control section, the touch panel 3B as an operation section. However, the present invention is not limited to this. A navigation apparatus according to the present invention may include a current-position information acquisition section including the other various circuit configurations, a camera section, a direction detection section, a direction determination section, a characteristic-point information extraction section, a control section, and an operation section.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus comprising:
   a current-position information acquisition section obtaining current-position information of a current position measured by a current-position measuring section;
   a camera section obtaining a captured image of a subject;
   a direction detection section detecting a direction at the time of obtaining the captured image by the camera section;
   from characteristic-point information related to predetermined characteristic points stored in a predetermined storage section, a characteristic-point information extraction section extracting the characteristic-point information related to the characteristic points located in the vicinity of the current position and in a range shown in the direction; and
   a control section configured to display the captured image on a predetermined display section,
   wherein the control section is configured to display (i) a predetermined direction line corresponding to a predetermined set standard range of distance and extending from the current position on the captured image, in which the predetermined direction line is at an angle indicating a direction as viewed from the current position on the captured image, and (ii) at an end of the predetermined direction line remote from the current position, distance information corresponding to the predetermined set standard range of distance from the current position, in which the distance information is displayed with unit of length indicia.

2. The navigation apparatus according to claim 1, wherein the control section is configured to obtain a distance and a direction from the current position to the characteristic point, and display the characteristic-point information at a position corresponding to the distance and the direction obtained on the captured image.

3. The navigation apparatus according to claim 2, wherein the characteristic-point information extraction section extracts, from a predetermined storage section, the characteristic-point information related to the characteristic point located in the vicinity of the current position and in a range shown in the direction determined by the direction and an imaging angle of view of the camera section.

4. The navigation apparatus according to claim 2, further comprising a direction determination section determining whether the direction in which the camera section obtained the captured image is a front or not, wherein if the direction determination section has determined that the direction is the front, the control section displays the captured image and the characteristic-point information on a predetermined display section, and if the direction determination section has determined that the direction is not the front, the control section obtains map information in the vicinity of the current position from a predetermined storage section on the basis of the current position information, and displays a map screen based on the map information on a predetermined display section.

5. The navigation apparatus according to claim 3, wherein if the extracted characteristic-point information is a predetermined number of pieces or less, the characteristic-point information extraction section expands a predetermined distance range set as the vicinity of the current position, and extracts the characteristic-point information related to the characteristic point located in a range of the expanded distance range and in a range shown in the direction.

6. The navigation apparatus according to claim 5, wherein the control section is configured to display the current position on the captured image, and a line segment connecting the current position and the characteristic-point information.

7. The navigation apparatus according to claim 5, further comprising an operation section accepting a user operation, wherein the characteristic-point information extraction section expands or contracts the distance range in accordance with the user operation.

8. A method of navigation, comprising the steps of:
obtaining current-position information of a current position, measured by a current-position measuring section, from a current-position information acquisition section;
obtaining a captured image of a subject by a camera section;
detecting a direction by a direction detection section at the time of obtaining the captured image by the camera section;
from characteristic-point information related to predetermined characteristic points stored in a predetermined storage section, extracting the characteristic-point information related to the characteristic points located in the vicinity of the current position and in a range shown in the direction; and
displaying the captured image on a predetermined display section by a control section,
in which the displaying includes displaying (i) a predetermined direction line corresponding to a predetermined set standard range of distance and extending from the current position on the captured image, in which the predetermined direction line is at an angle indicating a direction as viewed from the current position on the captured image, and (ii) at an end of the predetermined direction line remote from the current position, distance information corresponding to the predetermined set standard range of distance from the current position, in which the distance information is displayed with unit of length indicia.

9. A non-transitory computer-readable medium storing a program causing a computer to execute a process including:
obtaining current-position information of a current position, measured by a current-position measuring section, from a current-position information acquisition section;
obtaining a captured image of a subject by a camera section;
detecting a direction by a direction detection section at the time of obtaining the captured image by the camera section;
from characteristic-point information related to predetermined characteristic points stored in a predetermined storage section, extracting the characteristic-point information related to the characteristic points located in the vicinity of the current position and in a range shown in the direction; and
displaying the captured image on a predetermined display section by a control section,
in which the displaying including displaying (i) a predetermined direction line corresponding to a predetermined set standard range of distance and extending from the current position on the captured image, in which the predetermined direction line is at an angle indicating a direction as viewed from the current position on the captured image, and (ii) at an end of the predetermined direction line remote from the current position, distance information corresponding to the predetermined set standard range of distance from the current position, in which the distance information is displayed with unit of length indicia.

10. An information processing system comprising:
a captured image acquisition section configured to acquire a captured image generated by a capturing of a camera section;
a direction information acquisition section configured to acquire a direction information related to a direction of the camera section;
from characteristic-point information related to predetermined characteristic points stored in a predetermined storage section, a characteristic-point information acquisition section configured to acquire the characteristic-point information related to the characteristic points located in the vicinity of a current position measured by a current-position measuring section and in a range shown in the direction; and
a control section configured to control a display section to display the captured image on a predetermined display section,
wherein the control section is configured to display (i) a predetermined direction line corresponding to a predetermined set standard range of distance and extending from the current position on the captured image, in which the predetermined direction line is at an angle indicating a direction as viewed from the current position on the captured image, and (ii) at an end of the predetermined direction line remote from the current position, distance information corresponding to the predetermined set standard range of distance from the current position, in which the distance information is displayed with unit of length indicia.

11. The information processing system according to claim 10, wherein the control section is configured to control the display section to display an object based on the characteristic-point information, and wherein the predetermined direction line indicates a distance and direction from the current position to one of the characteristic points relating to the characteristic-point information.

12. The information processing system according to claim 11, wherein the display section is a touch panel display and configured to accept a touch operation of a user of the system, and the control section is configured to control the display section to change a display relating to the characteristic-point information according to the touch operation.

13. A method comprising:

acquiring a captured image generated by a capturing of a camera section;

acquiring a direction information related to a direction of the camera section;

from characteristic-point information related to predetermined characteristic points stored in a predetermined storage section, acquiring the characteristic-point information related to the characteristic points located in the vicinity of a current position measured by a current-position measuring section and in a range shown in the direction;

displaying the captured image on a predetermined display section; and displaying, by a control section, (i) a predetermined direction line corresponding to a predetermined set standard range of distance and extending from the current position on the captured image, in which the predetermined direction line is at an angle indicating a direction as viewed from the current position on the captured image, and (ii) at an end of the predetermined direction line remote from the current position, distance information corresponding to the predetermined set standard range of distance from the current position, in which the distance information is displayed with unit of length indicia.

14. A non-transitory computer-readable medium embodying a program, that when executed by a computer, performs the steps of:

acquiring a captured image generated by a capturing of a camera section;

acquiring a direction information related to a direction of the camera section;

from characteristic-point information related to predetermined characteristic points stored in a predetermined storage section, acquiring the characteristic-point information related to the characteristic points located in the vicinity of a current position measured by a current-position measuring section and in a range shown in the direction;

displaying the captured image on a predetermined display section; and displaying, by a control section, (i) a predetermined direction line corresponding to a predetermined set standard range of a distance and extending from the current position on the captured image, in which the predetermined direction line is at an angle indicating a direction as viewed from the current position on the captured image, and (ii) at an end of the predetermined direction line remote from the current position, distance information corresponding to the predetermined set standard range of distance from the current position, in which the distance information is displayed with unit of length indicia.

* * * * *